United States Patent [19]

Blankenbecler

[11] Patent Number: 5,541,774

[45] Date of Patent: Jul. 30, 1996

[54] SEGMENTED AXIAL GRADIENT LENS

[76] Inventor: Richard Blankenbecler, 974 Cottrell Way, Stanford, Calif. 94305

[21] Appl. No.: 395,387

[22] Filed: Feb. 27, 1995

[51] Int. Cl.[6] .............................. G02B 3/00; G02B 13/10
[52] U.S. Cl. ........................ 359/653; 359/669; 359/670
[58] Field of Search ................................. 359/668–671, 359/652–654

[56] References Cited

U.S. PATENT DOCUMENTS

| | | | |
|---|---|---|---|
| 1,943,521 | 1/1934 | Ewald | 359/652 |
| 2,216,965 | 10/1940 | Sukumlya | 359/668 |
| 2,596,799 | 5/1952 | Tillyer et al. | 359/715 |
| 4,501,468 | 2/1985 | Borrelli et al. | 359/654 |
| 4,758,071 | 7/1988 | McLaughlin et al. | 359/653 |
| 4,805,997 | 2/1989 | Asahara et al. | 359/653 |
| 4,810,070 | 3/1989 | Suda et al. | 359/653 |
| 4,900,138 | 2/1990 | Atkinson, III et al. | 359/653 |
| 4,907,864 | 3/1990 | Haterty et al. | 359/653 |
| 4,929,065 | 5/1990 | Hagerty et al. | 359/653 |
| 4,952,037 | 8/1990 | Oikawa et al. | 359/653 |
| 5,044,737 | 9/1991 | Blankenbecler | 359/653 |
| 5,236,486 | 8/1993 | Blankenbecler et al. | 65/61 |
| 5,262,896 | 11/1993 | Blankenbecler | 359/653 |
| 5,323,268 | 6/1994 | Kikuchi | 359/664 |

OTHER PUBLICATIONS

J. M. Stagaman and D. T. Moore, "Laser diode to fiber coupling using anamorphic gradient–index lenses", Applied Optics, vol. 23, No. 11, Jun. 1, 1984, pp. 1730–1734.
C. Wang and D. L. Shealy, "Design of gradient–index lens systems for laser beam reshaping", Applied Optics, vol. 32, No. 25, Sep. 1, 1993, pp. 4763–4769.
Leo Levi, *Applied Optics: A Guide to Optical System Design/Volume 1*, 1968, pp. 488–493.
A. C. S. Van Heel, "One radius doublets", Opt. Acta, vol. 2, No. 1, Apr. 1955, pp.29–35.
R. Blankenbecler et al., "Gradient index glass of macro dimensions and Large Δn", Journal of Non–Crystalline Solids, 129 (1991) pp. 109–116.

*Primary Examiner*—Georgia Y. Epps
*Assistant Examiner*—Evelyn A. Lester
*Attorney, Agent, or Firm*—Steven Mitchell

[57] ABSTRACT

A segmented axial gradient lens and a lens system using such lenses are provided. The lens has an optical axis and is composed of a plurality of segments. The interfaces between the segments are either planes inclined at an angle to the optical axis, wedges or cones. At least one segment has a predetermined axial index of refraction profile while other segments may have either a predetermined homogeneous index of refraction or a predetermined axial index of refraction profile. The interface geometry and the index of refraction profiles are chosen to provide lenses with desirable optical properties from segments having only simple interfaces. Spherical and cylindrical aberrations can be reduced or eliminated by appropriate choice of the index of refraction profile even for a lens fabricated entirely from segments with flat surfaces. The front and rear surfaces of the lens assembly can also be ground and polished into spherical or cylindrical shapes. The index profiles can then be chosen to augment the optical power of the lens assembly as well as to reduce the aberrations. In another embodiment, the segmented axial gradient lens provides a unified anamorphic lens system by mounting two axial gradient lenses with interfaces rotated 90 degrees from each other via a homogeneous segment. This provides the same functionality as two separate cylindrical lenses mounted at right angles to each other. In still another embodiment, two segmented axial gradient lenses are mounted in a lens system with their orientations rotated 90 degrees about the optical axis from each other to provide independent manipulation of a beam in two transverse orthogonal directions.

23 Claims, 8 Drawing Sheets

FIGURE 1 -- PRIOR ART

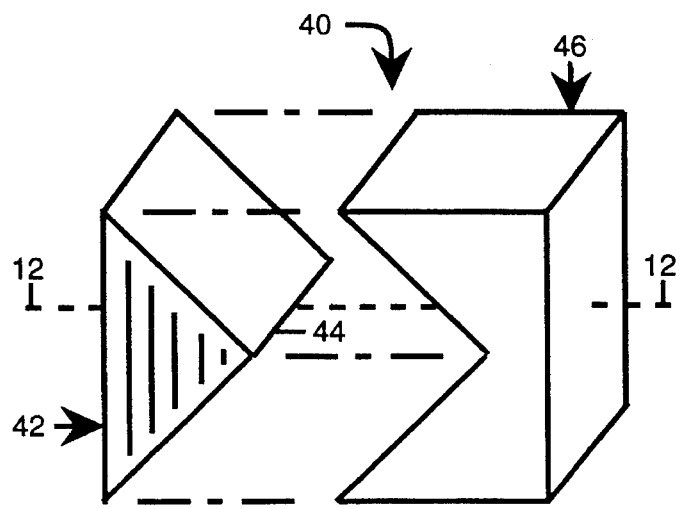
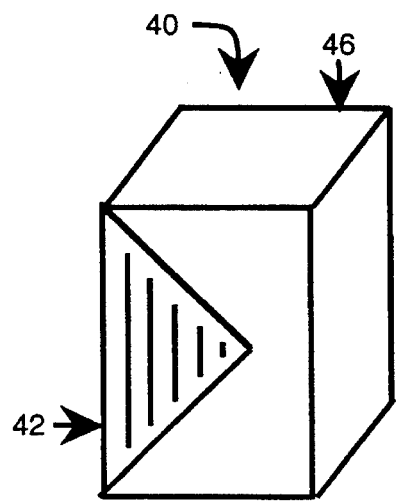
FIGURE 3 A
FIGURE 3 B
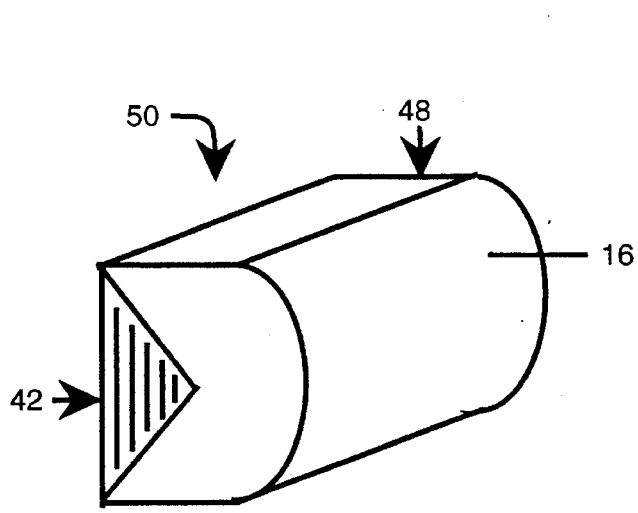
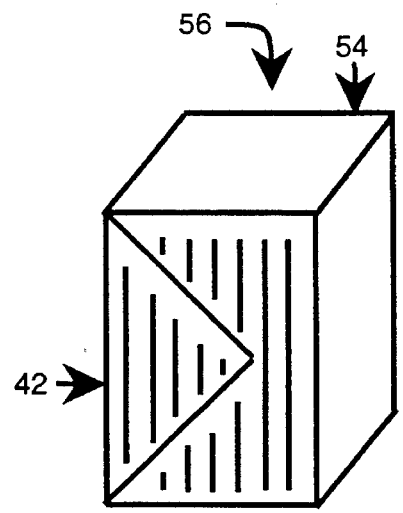
FIGURE 3 C
FIGURE 3 D

SEGMENTED AXIAL GRADIENT LENS

BACKGROUND OF THE INVENTION

1. Field of the Invention

The present invention relates generally to lenses, and more particularly to lenses formed from a plurality of segments some of which have axial refractive index gradients.

2. Prior Art

A conventional lens with spherical surfaces and with a homogeneous index of refraction will not focus light perfectly; there will be spherical and chromatic aberrations. The latter aberrations may be canceled, for example, by using a lens doublet in which each lens has a unique chemical composition and therefore an index of refraction with its own dependence on the wave length of light. The chromatic aberrations can be reduced by cancellation between the two indices. The spherical aberrations can be eliminated by the expensive and difficult process of grinding a predetermined aspherical surface on the lens. It is also well known in the art that these aberrations can be eliminated by employing axial gradient lens blanks. An axial gradient lens is a lens which has an index of refraction profile which varies in one direction only, usually chosen to be the optical axis. These aberration free lenses can be used advantageously in a variety of optical systems, such as slide projectors, cameras, binoculars, and many other imaging devices; the number of lens elements required for a given task can be reduced as well as the weight and complexity of the system.

The blanks for the fabrication of such gradient lenses can be made by a variety of processes such as SOL-GEL, infusion, and diffusion and may be glass, plastic or other suitable optical material. In particular, there is the controlled diffusion process that can produce macro lenses with a prescribable index of refraction axial profile. The fabrication of such axial gradient lenses by the controlled diffusion process is disclosed in U.S. Pat. No. 5,262,896, "Refractive Elements With Graded Properties and Methods for Making Same", to R. Blankenbecler, which patent is incorporated herein by reference. These lenses are available from Light-Path Technologies of Tucson, Ariz.

The above discussion applies to both radial and cylindrical lenses; however the grinding and polishing of cylindrical lenses to the needed precision is especially difficult. Cylindrical lenses condense or expand a beam of light in one transverse dimension only; they can focus light into a thin line and are used in laser scanners, fax machines, laser printers, and in the Cinemascope process, for example. Cylindrical lenses also can be used to produce a symmetrical output beam from an unsymmetrical source such as a laser diode. An improved type of cylindrical lens that does not require a cylindrical surface on the lens, yet offers the optical designer increased flexibility, is highly desirable.

A lens design for coupling a laser diode to a multimedia fiber using anamorphic radial gradient-index components is described by J. M. Stagaman and D. T. Moore, "Laser diode to fiber coupling using anamorphic gradient-index lenses", *Applied Optics*, vol. 23, no. 11, pp. 1730–1734 (1984). These authors discuss the disadvantages and difficulties in the conventional approach of utilizing prisms and/or cylindrical lenses. Their optimum design for a lens system to be used with a laser diode source with astigmatism uses a gradient index lens with an elliptical profile. However, there is no known method to fabricate a general anamorphic lens in which each transverse dimension has its own independent index profile. A new type of lens that allows the fabrication of a general anamorphic lens is highly desirable.

A monolithic anamorphic lens having at least one curved surface and an axial gradient index parallel to an optical axis is disclosed in U.S. Pat. No. 4,900,138 to Atkinson, III et al., issued Feb. 13, 1990. This patent also describes other gradient index profiles and is incorporated herein by reference.

A cemented lens design in which two (or more) different types of homogeneous glass are ground into the proper shape then polished and cemented together, is well known in the art. In *Applied Optics*, by Leo Levi, Vol. 1, John Wiley & Sons, New York, (1968), it is stated that with a proper choice of glasses and shapes, it is possible to reduce both chromatic and spherical aberrations in a cemented lens despite the severe restrictions on available choices. A variation of this type of lens has also been described by A. C. S. van Heel in "One-Radius Doublets", *Optica Acta*, Vol. 2, pp. 29–35 (1955).

Also known to the art is a segmented lens design in which two different types of homogeneous glass with different values of the index of refraction are bonded together by heat and the interface molded (slumped) into a prescribed shape. The external faces are then ground flat. This is a monolithic lens with a discontinuous index of refraction across a smooth aspherical interface. This lens has low optical power and has been proposed as a corrector plate. Such a lens is disclosed in U.S. Pat. No. 2,596,799, "Aberration Corrector Member for Image Forming Optical Objectives", to Tillyer, et. al., issued May 13, 1952.

Another type of segmented lens known to the art is built up of constituents of different indices of refraction as described by W. Ewald, in "Lens for Optical Purposes" U.S. Pat. No. 1,943,521, issued Jan. 16, 1934. The separate parts of the lenses, each of which is homogeneous, are cemented together in such a manner that the boundary surfaces or interfaces are substantially located in the direction of the path of light rays. That is, the interfaces are parallel to the optical axis. The indices of refraction are chosen so as to reduce the spherical aberration of the lenses and produce clearly defined images on a screen.

A patent teaching the fabrication and design of a double axial gradient lens blank has been granted to the present inventor, R. Blankenbecler, "Double Axial Gradient Lens and Process for Fabrication Thereof", U.S. Pat. No. 5,044,737, issued Sep. 3, 1991. A diffusion process produces a monolithic lens with a continuous index of refraction profile; the lens is composed of three regions, front, center, and rear, each of which can have its own graded index of refraction profile and chemical composition.

A patent teaching the forming of a cylindrical or spherical gradient lens blank from an axial gradient lens blank by heat molding (slumping) has been granted to R. Blankenbecler and M. Wickson, "Shaped Gradient Fabrication In Lenses By Molding From Axial Gradient", U.S. Pat. No. 5,236,486, issued Aug. 17, 1993. This process produces a monolithic lens with a continuous index of refraction profile.

A design for a cemented gradient index lens system for laser beam reshaping is disclosed by C. Wang and D. L. Shealy, "Design of gradient-index lens systems for laser beam reshaping", *Applied Optics*, vol. 32, pp. 4763–4769 (1993). A system using two axial gradient lenses and a homogeneous central transfer lens is disclosed. The front and rear faces are flat planes. The interfaces between the front gradient lens and the central transfer lens and the central transfer lens and the rear gradient lens are spherical surfaces that must be ground and polished to fit into each other. In addition, the gradient index profiles are different and must be chosen properly to function as a beam reshaper. A simpler design that does not require multiple spherical surfaces to be ground and polished to such precision is highly desirable.

As mentioned above, spherical and chromatic aberrations will be present in lenses with spherical or cylindrical external surfaces. A suitable index of refraction profile (essentially linear) in the spherical or cylindrical lens cap can be used to cancel the spherical aberration and form a precise image. However this normally requires a large change in index across the profile. Furthermore, the surface of the cap must be ground and polished in a region of varying index, varying hardness, and varying coefficient of thermal expansion which is a difficult process to carry out with accuracy. An aspherical shaped surface on a homogeneous lens will also reduce this particular aberration, but the fabrication of such a lens surface with the required accuracy is a very difficult process. Even the grinding and polishing of a simple cylindrical surface on a lens blank is difficult and expensive. Thus, a new cylindrical lens fabrication technique that eliminates this fabrication step by replacing the curved surface with a plane surface yet eliminates spherical aberration is highly desirable.

It is therefore an object of the invention to provide an improved type of lens having the function of a cylindrical lens that does not require a cylindrical surface on the lens.

It is another object of the invention to provide a general anamorphic lens in which each transverse dimension has its own independent index profile.

It is a further object of the invention to provide a cemented gradient index lens system for laser beam reshaping that does not require multiple spherical surfaces to be ground and polished to a high precision.

It is still another object of the invention to provide a lens system which provides independent manipulation of a beam of light in two transverse orthogonal directions.

SUMMARY OF THE INVENTION

The segmented axial gradient lens of the invention provides a flexible framework for the lens designer to achieve many desirable optical functions. In particular, the difficulty of fabricating conventional cylindrical lenses contrasts with the simple plane fabrication offered by the segmented axial gradient lens of the invention. However, the segmented axial gradient lens concept is not restricted just to cylindrical optical applications or plane interfaces.

In a preferred embodiment of the invention, a segmented axial gradient lens is provided having a front surface, a rear surface and an optical axis. The lens comprises a plurality of segments joined at one or more interfaces with the interfaces selected from the group is comprising planes, wedges and cones. The segments are clamped, cemented, or heat bonded to form a monolithic lens assembly. The surface of each interface forms an angle other than 90 degrees with the optical axis and at least one of the segments has a predetermined index of refraction profile chosen to achieve a desired optical function. Where the lens includes two segments, one segment may have an axial gradient index of refraction with the other segment having a homogeneous index of refraction or both segments may have an axial gradient index. Radially symmetric optical functionality can be achieved by using cone shaped interfaces.

In another embodiment of the invention, the lens comprises three segments with the first and third segments having a gradient index and the second or middle segment having a homogeneous index.

In still another embodiment of the invention, the segmented axial gradient lens provides a unified anamorphic lens system by mounting two axial gradient wedges with wedge angles at right angles to each other via a homogeneous segment. This provides the same functionality as two separate cylindrical lenses mounted at right angles to each other.

The segmented axial gradient lens offers increased flexibility to the optical designer. Since the optical power of the lens is provided by the difference in index between the adjoining segments, the lens can exhibit smaller chromatic aberrations than a conventional lens. The chemical composition of each segment can be chosen to ameliorate the chromatic aberrations. Thus, in general, the use of segmented axial gradient lenses allows the fabrication of optical systems with increased performance at lower cost.

BRIEF DESCRIPTION OF THE DRAWINGS

The various features and advantages of the present invention may be more readily understood with reference to the following detailed description taken in conjunction with the accompanying drawings in which:

FIG. 3A is an exploded view of a two segment axial gradient lens of the invention with a wedge interface between an axial gradient segment and a homogeneous segment.

FIG. 3B is an assembled view of the lens of FIG. 3A.

FIG. 3C is a two segment axial gradient lens of the invention with a wedge interface between an axial gradient segment and a homogeneous section having a back cylindrical surface.

FIG. 3D is a two segment axial gradient lens of the invention with a wedge interface between two axial gradient segments.

DETAILED DESCRIPTION OF THE INVENTION

In accordance with the invention, a segmented axial gradient lens is provided. As used herein, a segmented lens is a lens composed of two or more close-fitting segments or sections. The contact surface between two segments is an interface. In addition, there is a front external surface and a rear external surface of the complete lens assembly. At least one of the segments contains an axial gradient in its index of refraction with the remaining having a homogeneous index of refraction or an axial gradient index. The is chemical composition of each segment may be chosen independently subject only to being consistent with the desired optical performance. The final lens assembly has the segments clamped, cemented, heat bonded or otherwise joined to form a monolithic unit. One novel feature of the invention is that the interfaces between the segments comprise either planes, wedges, or cones. These interface surfaces must be set at a finite angle to the optical axis. For purposes of this application, this is intended to mean that a general ray drawn parallel to the optical axis will intersect the interface at a non-normal angle. In addition, the interface surfaces are non-normal to the optical axis (with the exception of the apex of a wedge interface of the invention which will intercept the optical axis at a 90 degree angle). These simple surfaces are easily fabricated using standard techniques well known in the art. No spherical or aspherical interface surfaces are required. However the front and rear external surfaces of the lens assembly may each be planar, spherical or cylindrical as demanded by the requirements of the design. The most desirable implementation for reasons of manufacturing simplicity is to use only plane surfaces.

Another novel feature of the invention is that the optical power and the optical function of the lens is provided by prescribing the index of refraction profile in the various segments. The difference in index between the adjoining segments produces a desired bend in an incident light ray path if it strikes the interface at a non-normal angle. Thus the interfaces are set at a finite angle to the optical axis. The resultant path of the light-ray can be calculated from known laws of optics.

Figure 1:
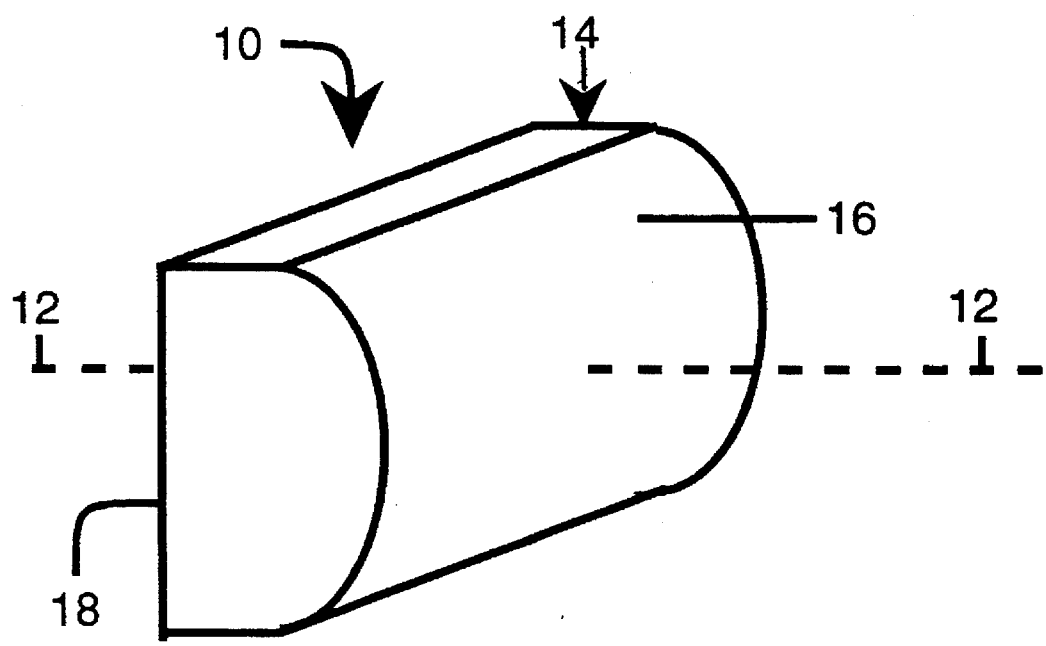
FIG. 1 is a plano-convex cylindrical lens of the prior art.

A standard homogeneous cylindrical lens 10 of planoconvex type with an optical axis 12 is depicted in FIG. 1 as a single representative of the prior art. A segment 14 has a constant index of refraction throughout. A rear surface 16 is cylindrical and a front face 18 is a plane with the rear surface 16 functioning to focus light in a single transverse direction.

Figure 2:
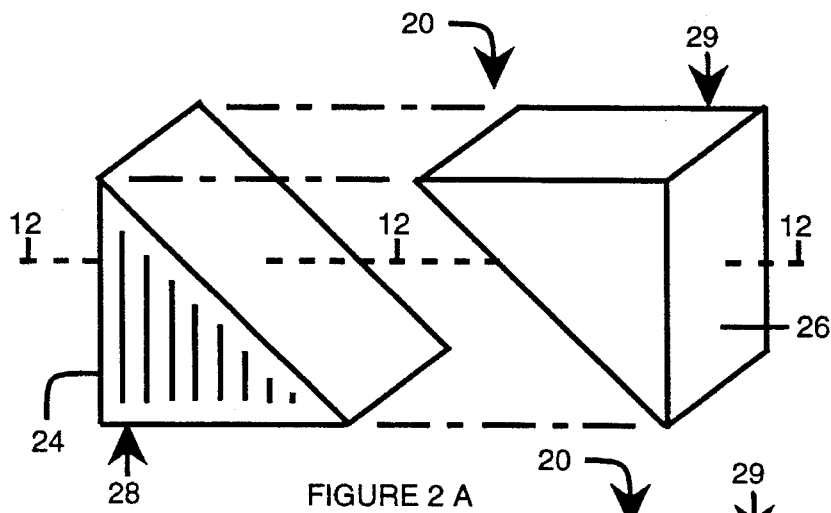
FIG. 2A is an exploded view of a two segment axial gradient lens of the invention with a planer interface between an axial gradient segment and a homogeneous segment.
FIG. 2B is an assembled view of the lens of FIG. 2A.
FIG. 2C is a two segment axial gradient lens of the invention with a planer interface between an axial gradient segment and a homogeneous section having a back cylindrical surface.
FIG. 2D is a two segment axial gradient lens of the invention with a planer interface between two axial gradient segments.
Figure 2:
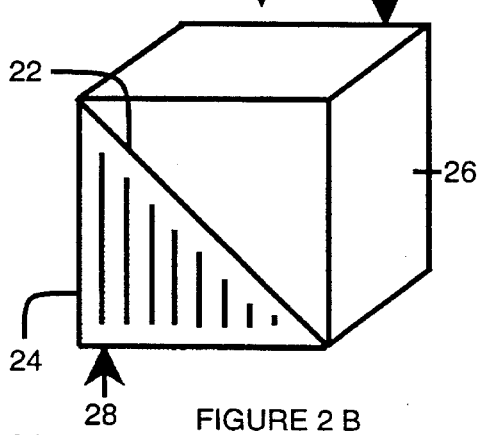
Figure 2:
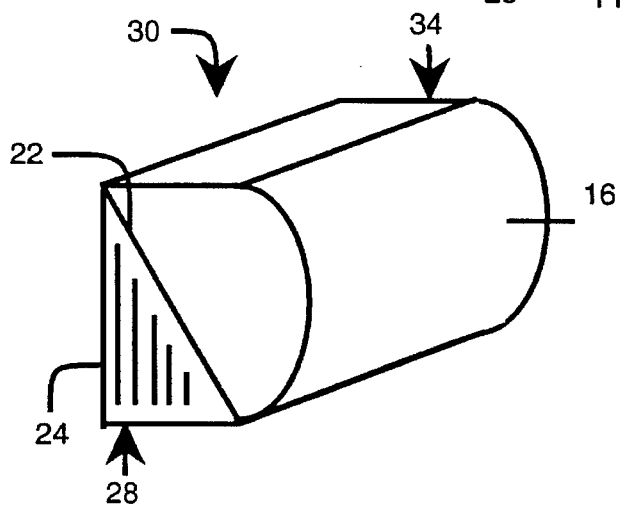
Figure 2:
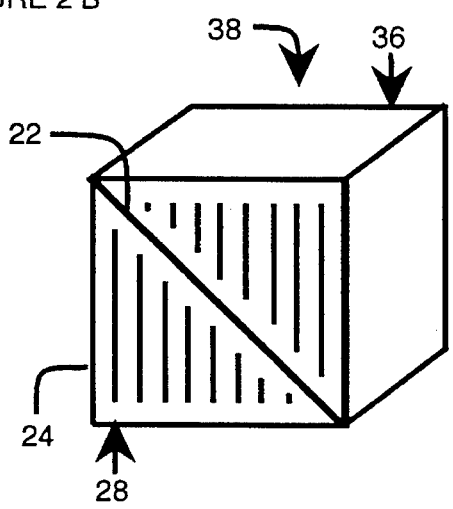

In FIGS. 2A and 2B the simplest embodiment of the segmented axial gradient lens is illustrated. A two segment cylindrical lens 20 is shown with an optical axis 12 in an exploded view in FIG. 2A and an assembled view in FIG. 2B. This design has a plane interface 22, a plane front surface 24 and a plane rear surface 26. A first segment 28 has an appropriately chosen axial variation in its index of refraction while a second segment 29 is homogeneous. In all the figures, the lines on the sides of the segments mark the planes of constant index of refraction which are normal to the optical axis 12. For a fixed total variation in the index of refraction along the interface, i.e., as measured down the slope of the interface 22, the focal length increases as the interface plane moves toward perpendicular to the optical axis 12. The image which exits the lens 20 can be moved perpendicular to the optical axis 12 (vertically in FIG. 2) by changing the value of the index of refraction of the homogeneous region. The use of a segmented axial gradient lens 30 with the cylindrical external surface 16 is illustrated in FIG. 2C. When the index of refraction profile of segment 28 is chosen appropriately, the lens functions as a compound lens and in addition, the aberrations arising from the constant curvature of the surface 16 of the homogeneous segment 34 can be canceled. The focal length given by the curved surface 16 can be preserved and the aberrations still canceled by choosing an axial index profile in the front segment 28 which varies slowly, essentially as the cube of the distance from the point where the optical axis 12 crosses the interface 22. Thus the curved surface 16 is fabricated in the homogeneous segment 34, a well known art, while the axial gradient segment 28 only has one flat front face 24 and one flat interface 22.

Homogeneous segment 29 in FIGS. 2A and 2B can be replaced by a segment 36 with an axial gradient region as depicted in FIG. 2D to provide a lens 38. If the index profile in segment 36 varies opposite to the index profile of segment 28, the lens 38 having a cylindrical functionality will have a shorter focal length (for the same total change in index of refraction in each segment) for appropriately chosen profiles. It is the difference in the value of the index of refraction in the two profiles at the point of intersection of a light ray with the interface 22 that determines the ray paths. Thus there is more freedom in choosing the individual profiles in the embodiment of FIG. 2D in that a designer has a larger set of parameters to vary in order to optimize selected optical and physical properties of the lens 38.

The plane interface 22 of FIGS. 2A–2D can be replaced by a wedge or cuneate interface as shown in FIGS. 3A–3D. An exploded view of a lens 40 is shown in FIG. 3A, and an assembled view is shown in FIG. 3B. A first wedge segment 42 with a linear tip or apex 44 has an appropriate variation in its index of refraction while a second segment 46 is homogeneous. The index of refraction of homogeneous segment 46 is preferably, but not necessarily, chosen to be equal to the value of the index of refraction at tip 44 of segment 42. It is obvious that the lens 40 will also function if segment 42 is homogeneous and segment 46 has a suitably chosen axial gradient. The use of an axial gradient wedge segment 42 and a homogeneous segment 48 with a cylindrical external surface 16 is illustrated with a lens 50 in FIG. 3C. If the index of refraction as profile of segment 42 is chosen appropriately, the lens 52 will function as a compound lens and the aberrations arising from the surface curvature of segment 50 can be canceled. The focal length given by the curved surface can be preserved and the aberrations canceled by choosing an axial index profile in the wedge segment 42 which varies slowly, essentially as the cube of the distance from the point where the optical axis 12 crosses the wedge interface 44. In this embodiment, the curved surface 50 is fabricated in the homogeneous segment, a well known art, while the axial gradient segment 42 only has a flat front surface and flat interfaces. As in the case of the plane interface, homogeneous segment 46 can be replaced by a segment 54 with a suitably chosen index gradient to yield a more flexible cylindrical lens functionality as is shown in FIG. 3D.

Figure 4:
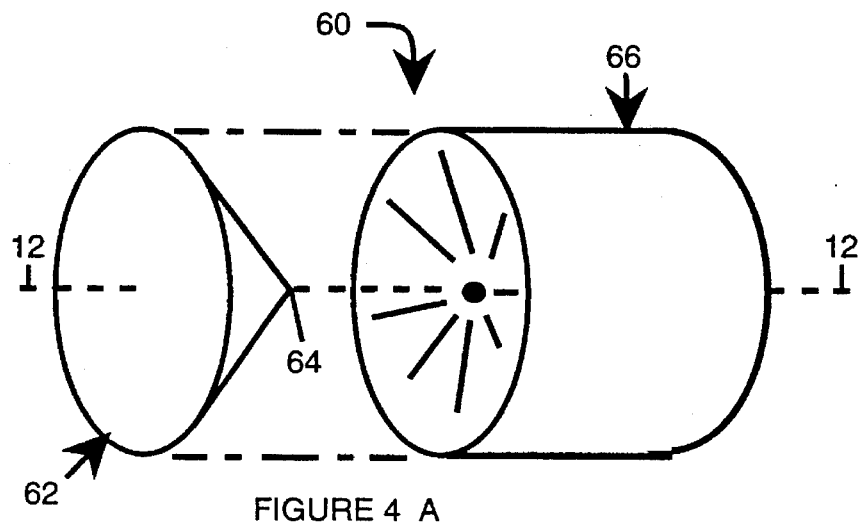
FIG. 4A is an exploded view of a two segment axial gradient lens of the invention with a cone interface between an axial gradient segment and a homogeneous segment.
FIG. 4B is a cross-sectional assembled view of the lens of FIG. 4A.
FIG. 4C is a two segment axial gradient lens of the invention with a cone interface between an axial gradient segment and a homogeneous section having a back spherical surface.
FIG. 4D is a cross-sectional view of a two segment axial gradient lens of the invention with a cone interface between two axial gradient segments.
Figure 4:
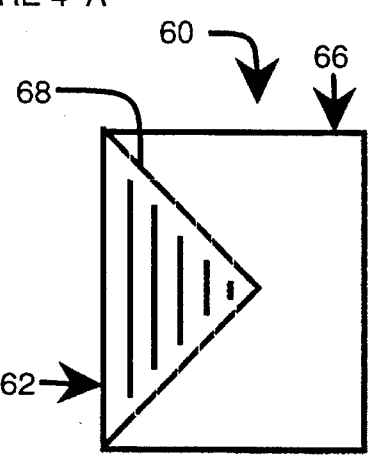
Figure 4:
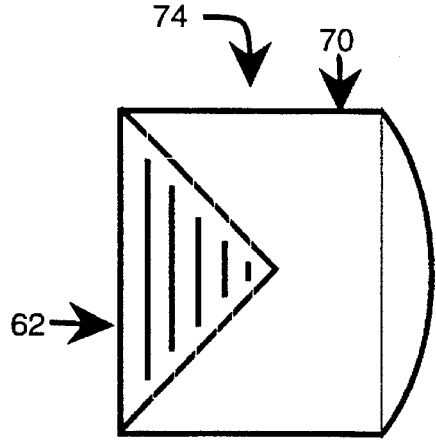
Figure 4:
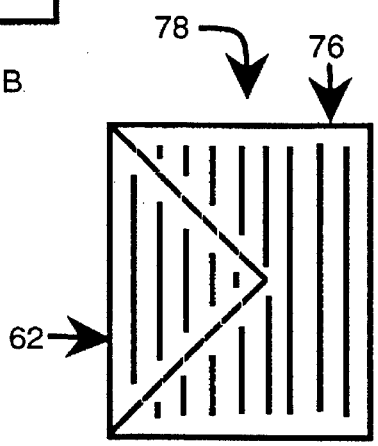

The linear wedge in the above embodiments can be replaced by a cone geometry as shown in FIGS. 4A–4D. An exploded view of lens 60 is shown in FIG. 4A and an assembled cross-sectional view is shown in FIG. 4B. A cone segment 62 with an axial gradient profile and a pointed tip 64 is inserted into an appropriately shaped homogeneous segment 66. The resultant lens 60 has a radial symmetry. The index of refraction of homogeneous segment 66 is preferably chosen to be equal to the value of the index at tip 64 of segment 62. When the index of refraction profile of segment 62 is chosen appropriately, the lens will produce a point focus instead of the line focus characteristic of a cylindrical lens. The use of an axial gradient cone segment 62 and a homogeneous segment 70 with a spherical external surface is illustrated with a lens 74 in FIG. 4C. If the index of refraction profile of segment 62 is chosen appropriately, the lens 74 will function as a compound lens and the aberrations arising from the surface curvature of segment 70 can be canceled. The focal length given by the curved surface can be preserved and the aberrations canceled by choosing an axial index profile in the wedge segment 62 which varies slowly, essentially as the cube of the distance from the point where the optical axis 12 crosses the cone interface point 64. In this embodiment, the curved surface is fabricated in the homogeneous segment, a well known art, as while the axial gradient segment 62 only has a flat front surface and cone shaped interface. As illustrated in FIG. 4D, the homogeneous segment can be replaced by a segment 76 with a gradient index profile that varies opposite to that of segment 62 to yield a more flexible design for a lens 78.

Other desirable optical functions can be achieved by a three segment lens. A lens having three segments, each with its own independent index of refraction profile, will give the lens designer the maximum flexibility. However, for simplicity, several examples in which one of the segments, the central or middle one, is homogeneous in the index of refraction will be described.

Figure 5:
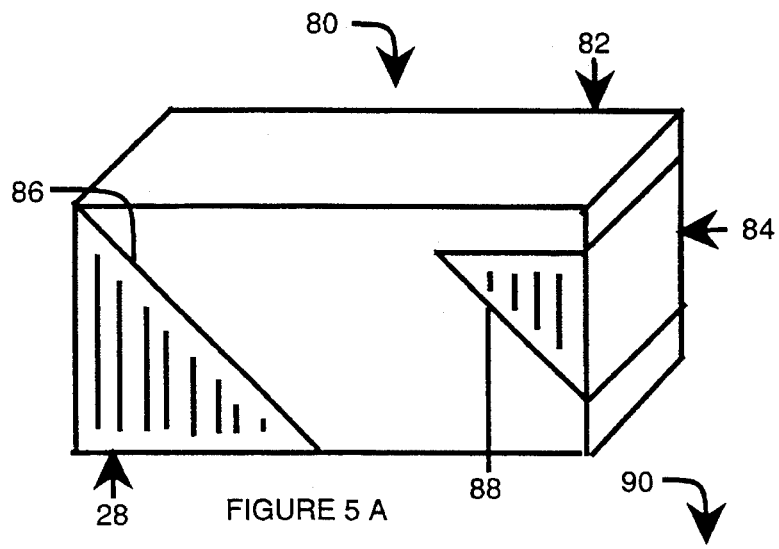
FIG. 5A is an assembled three segment axial gradient lens of the invention having two plane interfaces with a homogeneous segment between two axial gradient segments.
FIG. 5B is a three segment axial gradient lens of the invention having two wedge interfaces with a homogeneous segment between two axial gradient segments.
FIG. 5C is a three segment axial gradient lens of the invention having two wedge interfaces with a tapered central homogeneous segment between two axial gradient segments.
Figure 5:
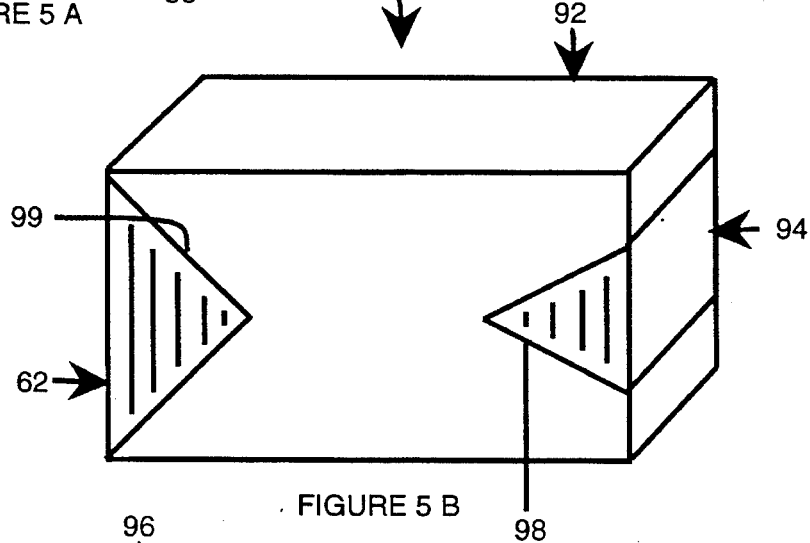
Figure 5:
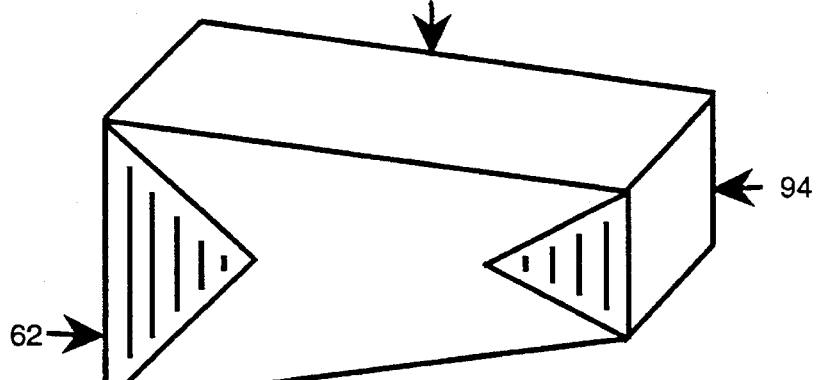

FIGS. 5A–5C show several three segment lens designs with two internal interfaces. In FIG. 5A, a lens 80 is depicted which is formed from an axial gradient segment 28 followed by a homogeneous segment 82 which in turn is followed by a second gradient segment 84 to form lens 80. This design has a front plane interface 86 and a rear plane interface 88. These segments have only plane optical surfaces and are cut to fit into each other. In FIG. 5B, a lens 90 with two optical wedge interfaces is depicted. An axial gradient wedge segment 62 is followed by a homogeneous segment 92 which in turn is followed by a second gradient wedge segment 94. These segments have only plane wedge interfaces and are cut to fit into each other. Homogeneous segment 92 can be replaced by a tapered segment 96 as shown in FIG. 5C. Both of these designs have a wedge shaped interface 98 in the rear and a wedge shaped interface 99 in the front as depicted in FIG. 5B.

If the wedges are aligned parallel to each other as in FIG. 5B and FIG. 5C, the index of refraction profiles in the first and third segments can be chosen so that the assembly operates as a cylindrical convex-convex, convex-concave, concave-convex or concave-concave lens. By appropriate choice of the index profiles, the resultant lens can be fabricated as either a positive (convergent) or a negative (divergent) cylindrical lens.

A cylindrical beam expander/contractor can be achieved by using the three-segment design types shown in FIGS. 5A–5C. The index of refraction profiles in segment 28 and segment 84 in FIG. 5A, and the index profiles in segment 62 and segment 94 in FIGS. B and 5C, can be chosen to scale the beam in one transverse direction while keeping the incident and exit rays parallel. The scaling of the beam can be either a contraction or an expansion in one dimension.

A cylindrical beam reshaper can also be achieved by the same design layout as illustrated in FIGS. 5A–5C. The index profiles in segment 28 and segment 84 in FIG. 5A, and the index profiles in segment 62 and segment 94 in FIGS. 5B and 5C, are chosen both to scale the beam and to redistribute the beam intensity as the designer requires. For example, in certain applications it is desirable to reshape the beam from a laser from an (essentially) gaussian transverse intensity distribution into a substantially flat distribution. This can be accomplished by choice of the index of refraction profiles of the front and rear axial gradient segments.

Figure 6:
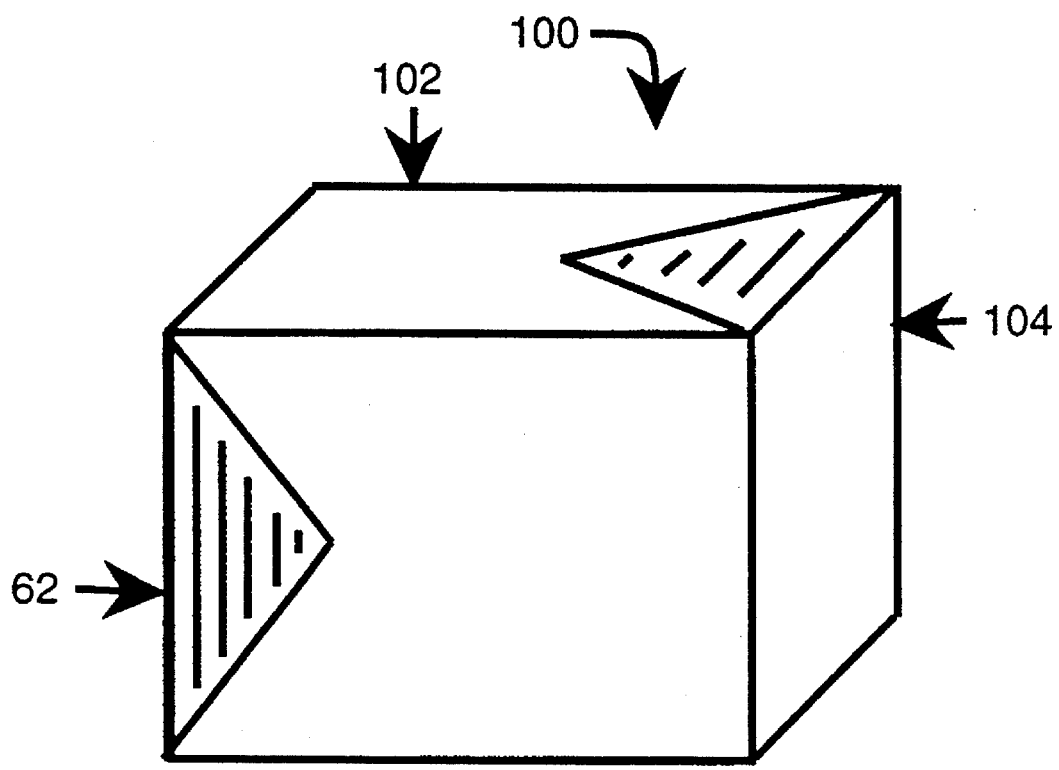
FIG. 6 is a three segment axial gradient lens of the invention having two axial gradient wedges with the wedge angles at right angles to each other via a homogeneous central segment.

Alternatively, the wedges can be aligned perpendicular to each other, as shown with a lens 100 in FIG. 6. An axial gradient wedge segment 62 is followed by a homogeneous segment 102 which is followed by a second gradient wedge segment 104 which is rotated 90 degrees from the orientation of wedge segment 62. The index of refraction profile in segment 62 and in segment 104 can be chosen so that the assembly 100 operates functionally as two cylindrical lenses at right angles to each other. By appropriate choice of these two index profiles, the resultant lens can function as a general anamorphic lens in which the optical parameters of the two transverse directions can be chosen independently.

Figure 7:
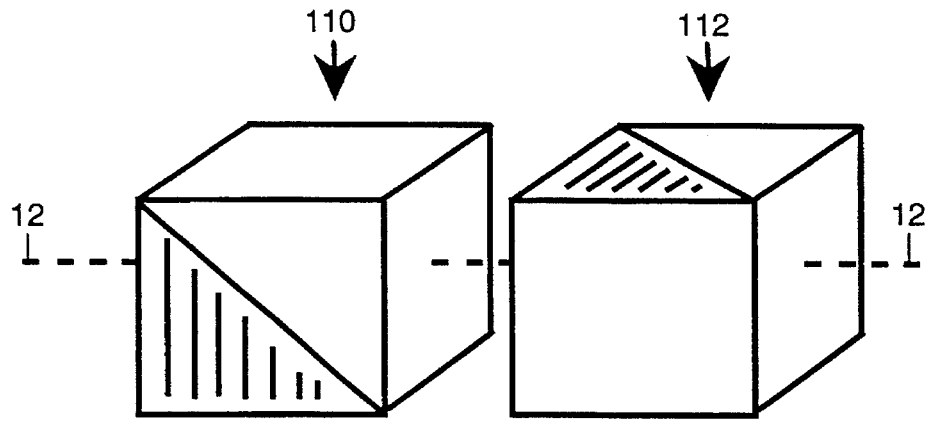
FIG. 7A is an axial gradient lens of the invention which is composed of two of the lenses of FIG. 2B mounted at right angles to each other.
FIG. 7B is an axial gradient lens of the invention which is composed of two of the lenses of FIG. 3B mounted at right angles to each other.
FIG. 7C is an axial gradient lens of the invention which is composed of two of the three segment lenses of FIG. 5B mounted at right angles to each other.
Figure 7:
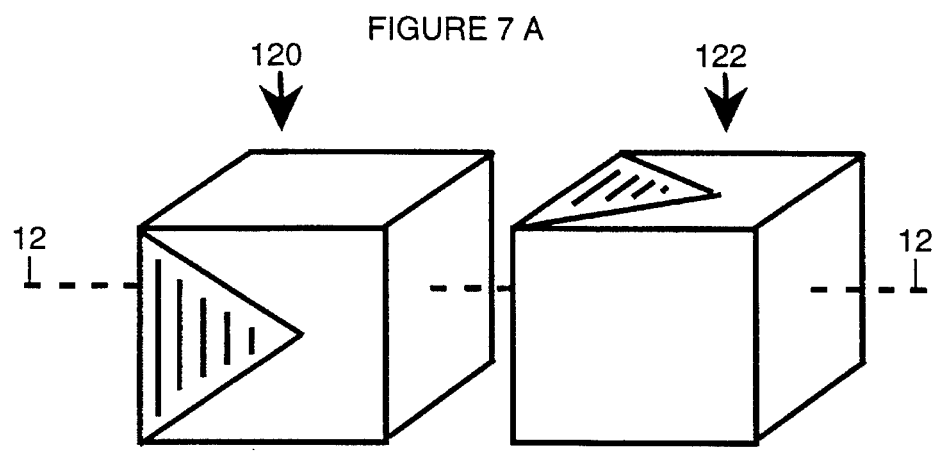
Figure 7:
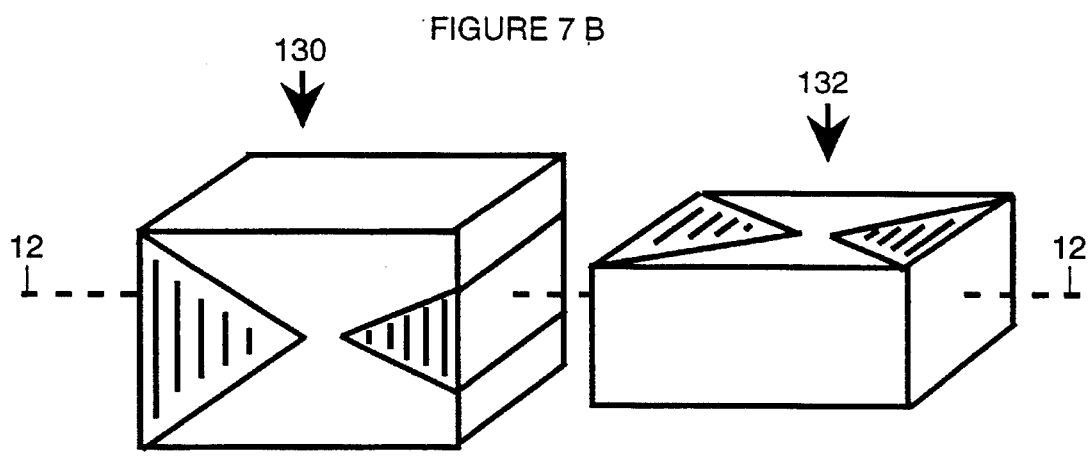

By placing two of the cylindrical function three-segment axial gradient lenses as described above, one behind the other but rotated 90 degrees about the optical axis, a beam can be independently manipulated in the two orthogonal transverse directions. Three lens systems utilizing this configuration are shown in FIG. 7. In FIG. 7A, two cylindrical lenses of the type depicted in FIG. 2B are arranged around optical axis 12. A segmented axial gradient lens 110 which will bend light in the vertical direction only is followed by a similar lens 112 which is rotated 90 degrees about optical axis 12 so that it bends light only in the horizontal direction. In FIG. 7B, two cylindrical lenses of the type depicted in FIG. 3B are arranged around optical axis 12. A segmented axial gradient wedge lens 120 which will bend light in the vertical direction only is followed by a similar lens 122 which is rotated 90 degrees so that it bends light only in the horizontal direction. In FIG. 7C, two three-segment lenses of the type depicted in FIG. 5B are arranged around optical axis 12. A three-segment axial gradient lens 130 which will affect the light rays only in the vertical direction is followed by a similar lens 132 which is rotated 90 degrees so that it affects the light rays only in the horizontal direction.

The optical power of the segmented axial gradient lens is due to the difference in index of refraction between the adjoining segments. The chemical composition of each segment can be chosen independently such as to ameliorate the chromatic aberrations in analogy to a standard chromatic doublet. The segmented axial gradient lens offers increased flexibility to the optical designer in its geometric parameters and the chemical composition of each segment. It also offers simple surfaces to the lens fabricator and simple index of refraction profiles to the maker of the lens blanks.

Theoretical Treatment

The following theoretical treatment provides the basics for selecting various lens parameters of a segmented axial gradient lens of the invention. The basic theoretical formulae given below are exact, but their solution will be given only in the small angle approximation. These are meant to demonstrate the general overall parameters and index of refraction profile required for the segmented axial gradient lens. Exact calculations of the properties needed to achieve a required performance of such a lens can be performed by several commercially available optical design software packages. One such package is "Code V" available from Optical Research Associates of Pasadena, Calif. Another package is "Synopsis" from BRO, Inc. of Tucson, Ariz. The coordinates used in the discussion are defined and illustrated in FIGS. 8A and 8B for the segmented axial gradient lens embodiments illustrated in FIGS. 3B and 5B respectively.

Figure 8:
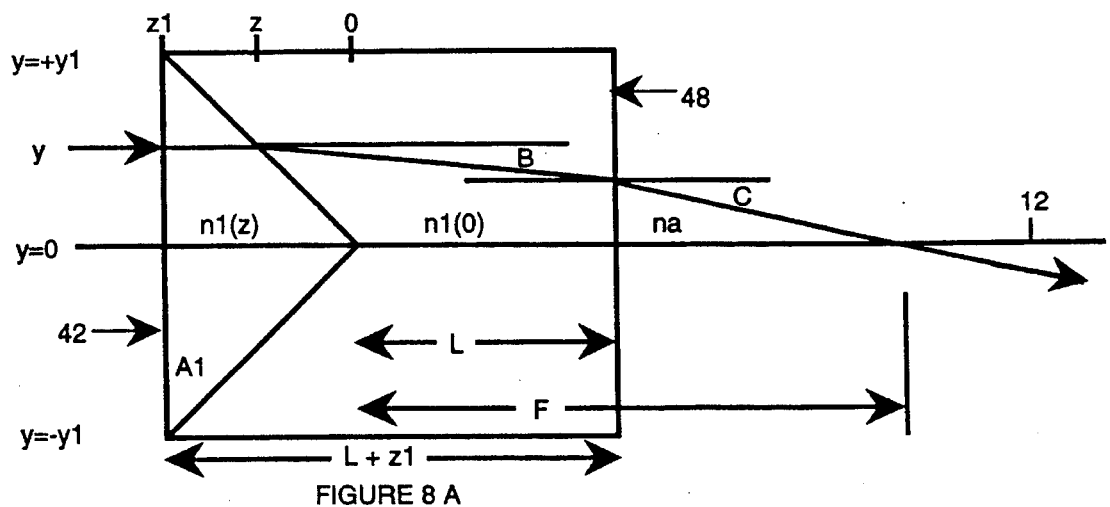
FIGS. 8A and 8B illustrate the parameters of the theoretical treatment of the lenses of FIGS. 2B and 5B respectively.
Figure 8:
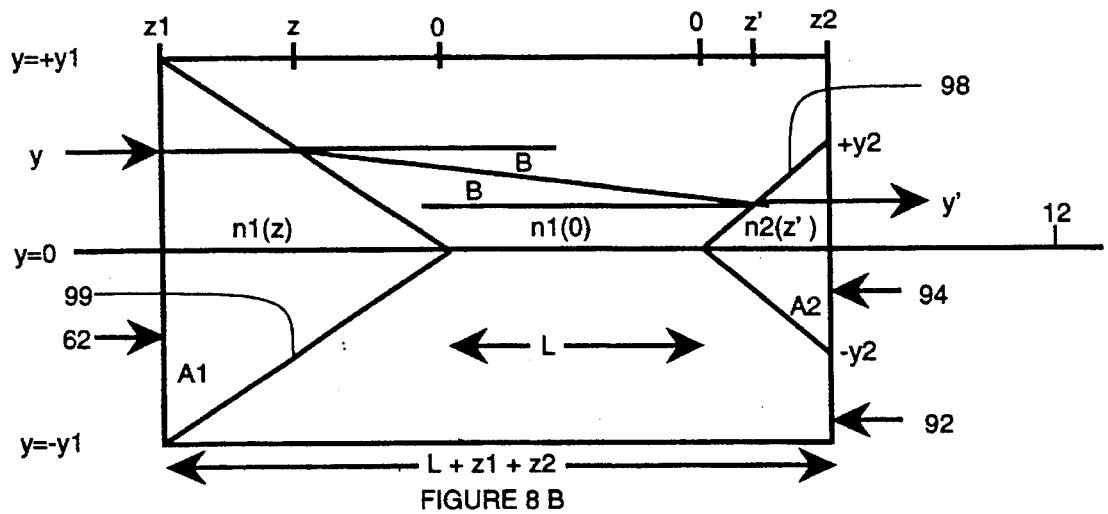

For the two segment wedge lens illustrated in FIG. 8A, the equations that determine the optical ray path for a horizontal ray displaced a distance of y above the central optical axis 12 are (1) $n1(z) \sin(A1) = n1(0) \sin(A1+B)$ (2) $n1(0) \sin(B) = na \cdot \sin(C)$ (3) $y = (F-L) \tan(C) + (L+z) \tan(B)$ (4) $z = y \cdot \tan(A1) = y \cdot z1/y1$ where: $n1(z)$ is the index of refraction of segment 42 as a function of the distance z from the apex 44 of the wedge segment 42 back along the optical axis 12 toward the front face of segment 42; A1 is the base angle for the wedge; $n1(0)$ is the index of refraction of homogeneous segment 48 (which is defined here to be equal to the index at the apex of the wedge); B is the angle a light ray is bent at the interface; na is the index of refraction of the medium within which the lens is positioned; C is the angle at which a ray exiting the rear face of the lens is bent; F is the focal length of the lens from the apex of the wedge; L is the distance from the apex of the wedge to the rear surface; z1 is the distance from the front face of the lens to the apex of the wedge; and y1 is one half the width of the base of the wedge.

A similar and symmetric treatment holds for rays incident below the central optical axis. Equations (1) and (2) are Snell's law of refraction applied at the wedge interface and at the rear surface. Equations (3) and (4) are geometric. For given dimensions of the lens and focal length, these equations determine $n1(z)$, the index profile of wedge section 42 as a function of z. Note that there is no bending of the ray path in the gradient region because the propagation direction is parallel to the index gradient.

For small angles, these equations can be solved by expanding the trigonometric functions. The index profile is (5) $n1(z)/n1(0) = 1 + z \cdot N/D(z)$, where (6) $N = (y1/z1)^2 \cdot (na/n1(0))$; and (7) $D(z) = F - L + (na/n1(0))(L+z)$.

For large focal length F, the function $D(z)$ is essentially constant, and the index profile becomes linear in z, the distance along the axis of the gradient segment. Even for finite F, the index varies smoothly. The change in index dn needed to produce the focal length F is then (8) $dn = n1(z1) - n1(0) = y1^2 \cdot na/[z1 \cdot D(z1)]$, and the focal length can be expressed as (9) $F = (L+z1) \cdot (1 - na/n1(0)) + (y1^2 \cdot na/dn - z1^2)/z1$.

A segmented lens with $z1 = y1$, $na = 1.0$, $n1(0) = 1.5$, $dn = 0.2$, well within the state of the art, has a focal length of

(10) $F = (L+z1)/3 + 4 \cdot z1$.

For example, there are commercially available standard cylindrical lenses with parameters of F=54 mm and y1=12 mm. These values can be matched by a segmented axial gradient lens with the above index values and with L=6 mm and y1=z1=12 mm.

Figure 9:
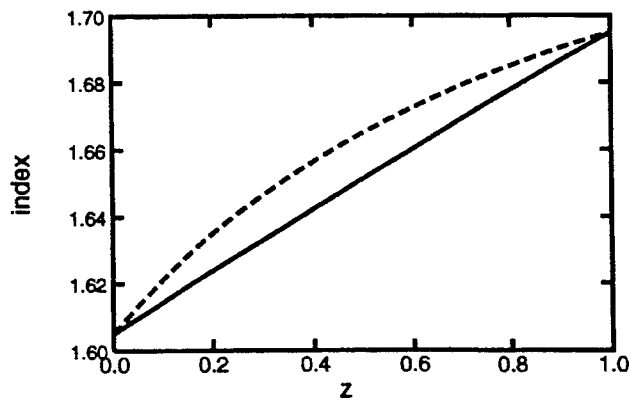
FIG. 9 is a graph showing the index of refraction profile required of the first segment of a lens of the type shown in FIG. 3B of the invention for two sample lens designs.

FIG. 9 shows the index profile required for a lens of the wedge type shown in FIG. 3B. Using the parameters as defined in FIG. 8A, the lens was assumed to have a full depth of 2 cm with L=1 cm and z1=1 cm. The range of the index of refraction was 1.695 to 1.605 and the homogeneous rear segment had an index of refraction of 1.605. The solid curve in FIG. 9 is the index profile calculated for a full height of 2 cm, that is, y1=1 cm, which yields a focal length F of 10.87 cm. The dashed curve in FIG. 9 is the index profile calculated for a reduced height of 0.67 cm, y1=0.335 cm, which yields a focal length F of 1 cm; thus F is equal to L, so that the image of an object at infinity will occur on the rear surface of the lens.

In FIG. 8B, a three segment design utilizing two axial gradient wedges 62, 94 is shown. This design will function as a beam expander/contractor or as a beam reshaper depending upon the index of refraction profiles that are chosen. The index of refraction profile in the first wedge 62 is denoted by $n1(z)$ and in the second wedge 94 by $n2(z')$. The index of the central homogeneous segment 92 is equal to $n1(0)$ which is equal to $n2(0)$. L is the distance between the apex of segment 62 and the apex of segment 94. A2 is the base angle for segment 94. The equations that determine the path for an incident horizontal ray displaced a distance y above the optical axis 12 which emerges horizontally at a distance y' above the axis are

(11) $n1(z) \sin(A1) = n1(0) \sin(A1+B)$

(12) $n1(0) \sin(A2-B) = n2(z') \sin(A2)$

(13) $\tan(B) = (y - y')/[L+z+z']$

(14) $z' = y'^* \tan(A1) = y^* z1/y1$

(15) $z' = y'^* \tan(A2) = y'^* z2/y2$.

A symmetric treatment holds for rays incident below the central optical axis 12. For given dimensions of the lens, focal length and functionality, these equations determine $n1(z)$ and $n2(z')$, the index profiles of the two wedges.

For small angles, these equations can be solved by expanding the trigonometric functions. The index profiles are

(16) $n1(z)/n1(0) = 1 + (y1/z1) \cdot B(z)$

(17) $n2(z')/n1(0) = 1 - (y1/z1) \cdot B(z')$, where

(18) $B = (y-y')/[L+z+z']$, and the ray deflection angle B can be expressed as a function of z or of z' to fully determine $n1(z)$ and $n2(z')$.

For the beam expander/contractor, the beam intensity distribution must be scaled in the y-direction. This implies that $y' = y \cdot y2/y1$ which in turn requires $z' = z \cdot z2/z1$, so that

(19) $B(z) = (z/z1) \cdot (y1-y2)/[L+z(1+z2/z1)]$

(20) $B(z') = (z'/z2) \cdot (y1-y2)/[L+z'(1+z1/z2)]$.

For L large compared to (z1+z2), the denominator in B is essentially constant, and both axial index profiles become linear in the distance along the optical axis of the gradient segment.

For a beam reshaper, the distribution of intensity in the incident beam must be rearranged to the desired final intensity distribution. Thus, the exit coordinate y' must be a given function of the entrance coordinate y, y'=y'(y). By using this y' value, and the implied relation between z' and z in the above equations for the as deflection angle B(z), the index distributions for the two axial gradient segments for the reshaper are completely determined.

For example, if the incident intensity distribution is i(y) (assumed symmetric) and the desired output intensity distribution is flat, the requirement of energy conservation forces the relation y'=y2*I(y)/I(y1), where I(y) is the integral of i(y) from 0 to the point y. This relation between y' and y then determines the relation between z' and z, and eventually, both of the index profiles.

Two examples of a segmented axial gradient lens based on the design of FIG. 2D have been fabricated. In both samples the height of the full front face was 9.0 mm and the angle between the interface and the front face was 32 degrees thus providing an angle of 58 degrees between optical axis 12 and interface 22 (as well as its opposing angle of 122 degrees.) The depth along the optical axis of the front segment was 5.6 mm. The rear segment 23 had the same dimensions. The identical index profiles in the front and rear segments varied essentially linearly along the optical axis and each index varied from 1.75 to 1.70. At the top and bottom of the interface, the maximum index of one segment met the minimum index of the other segment. The front and rear surfaces were planes perpendicular to the axis. The first sample had the index gradient arranged so that it operated as a converging focusing lens. The focal length of the example lens was measured to be 123 mm, in agreement with the theoretical expectations from the law of refraction as discussed above. The second sample had the index gradient arranged oppositely so that it operated as a diverging lens. The focal length of this example lens was found to be negative in agreement with the theoretical expectations.

If a segmented axial gradient lens is used in an optical system which contains other optical elements, the designer can choose the index of refraction profile to meet the performance requirements of the total system. In short, the index gradient can correct for the aberrations induced by several lens elements. For example, the designer can replace an ordinary element with a segmented axial gradient lens and choose its index profile so that the aberrations are minimized in one transverse direction. A second segmented axial gradient lens mounted at right angles to the first can minimize the aberrations in the orthogonal transverse direction.

It should be understood that various alternatives to the embodiments of the invention described herein may be employed in practicing the invention. It is thus intended that the following claims define the scope of the invention and that structures and methods within the scope of these claims and their equivalents be covered thereby.

What is claimed is:

1. A segmented lens having a front surface, a rear surface and an optical axis, said lens comprising:

at least two segments joined with an interface between each pair of adjacent segments, each interface forming finite, non-normal angles with said optical axis; and at least one of said segments having an axial index of refraction profile.

2. The lens of claim 1 wherein said front surface and said rear surface are each planar.

3. The lens of claim 1 wherein said front surface is planar and said rear surface is cylindrical.

4. The lens of claim 1 including first and second segments wherein said first segment has an axial index of refraction profile chosen to achieve a desired optical function and said second segment has a homogeneous index of refraction.

5. The lens of claim 4 wherein said interface is a plane inclined at a predetermined angle from said optic axis and wherein said index of refraction profile is chosen to produce the functionality of a cylindrical lens.

6. The lens of claim 4 wherein said interface is a wedge with its sides inclined at a predetermined angle from said optical axis and said index of refraction profile is chosen to produce the functionality of a cylindrical lens.

7. The lens of claim 4 wherein said interface is a cone with its sides inclined at a predetermined angle from said optical axis and said index of refraction profile is chosen to produce the functionality of a radial lens.

8. The lens of claim 1 including first and second segments wherein each segment has a chosen index of refraction profile.

9. The lens of claim 8 wherein said interface is a plane inclined at a predetermined angle from said optical axis and wherein said index of refraction profiles are chosen to produce the functionality of a cylindrical lens.

10. The lens of claim 8 wherein said interface is a wedge with its sides inclined at a predetermined angle from the said optical axis and said index of refraction profiles are chosen to produce the functionality of a cylindrical lens.

11. The lens of claim 8 wherein said interface is a cone with its sides inclined at a predetermined angle from the said optical axis and said index of refraction profiles are chosen to produce the functionality of a cylindrical lens.

12. The lens of claim 1 including first, second and third segments wherein said first segment has an axial index of refraction profile, said second segment has a homogeneous index of refraction, and said third segment has an axial index of refraction profile, said lens arranged with said second segment between said first and third segments thereby forming a front interface between said first and second segments and a rear interface between said second and third segments.

13. The lens of claim 12 wherein said front and rear interfaces are wedges rotated 90 degrees from each other and said index of refraction profiles of said first and third segments are chosen to produce the functionality of a general anamorphic lens.

14. The lens of claim 12 wherein said front and rear interfaces are planes rotated 90 degrees from each other and said index of refraction profiles of said first and third segments are chosen to produce the functionality of a general anamorphic lens.

15. The lens of claim 12 wherein said front and rear interfaces are wedges mounted parallel to each other and said index of refraction profiles of said first and third segments are chosen to produce the functionality of a cylindrical lens.

16. The lens of claim 12 wherein said front and rear interfaces are planes mounted parallel to each other and said index of refraction profiles of said first and third segments are chosen to produce the functionality of a cylindrical lens.

17. The lens of claim 15 wherein said axial index of refraction profile in said first segment and said axial index of refraction profile in said third segment are chosen to act on an incident beam so as to both change the beam's transverse dimension and redistribute the intensity distribution of the beam.

18. The lens of claim 16 wherein said axial index of refraction profile in said first segment and said axial index of refraction profile in said third segment are chosen to act on an incident beam so as to both change the beam's transverse dimension and redistribute the intensity distribution of the beam.

19. The lens of claim 12 wherein each of said front and rear interfaces are chosen to be cones and wherein said axial index of refraction profiles of said first and third segments are chosen to produce the functionality of a radial lens.

20. The lens of claim 19 wherein said axial index of refraction profile in said first segment and said axial index of refraction profile in said third segment are chosen to act on an incident beam so as to both change an incident beam's radial transverse dimension and redistribute the beam's radial intensity distribution.

21. A method for making a segmented axial gradient lens comprising the steps of:

providing at least two lens segments, each having an optical axis, a first lens segment having a front external surface and an interface surface and a second lens segment having a rear external surface and an interface surface, at least one of said segments having a predetermined axial index of refraction profile, wherein adjacent ones of said interface surfaces have corresponding shapes selected from the shapes of planes, wedges and cones, wherein said planes are inclined at a finite, non-normal angle to said optical axes of said segments; and joining said segments at their respective interface surfaces.

22. An anamorphic lens having a front external surface, a rear external surface and an optical axis, said lens comprising:

a first segment including said front external surface and an interface surface;

a second segment including two interface surfaces on opposite sides thereof; and a third segment including said rear external surface and an interface surface;

wherein at least two of said segments have an axial index of refraction profile, said lens arranged with said second segment between said first and third segments thereby forming a front interface between said first and second segments and a rear interface between said second and third segments, each of said interfaces forming finite, non-normal angles with said optical axis.

23. A lens system comprising:

a first multi-segment axial gradient lens having an optical axis;

a second multi-segment axial gradient lens having an optical axis;

said first and second lenses each including at least a front segment and a rear segment, at least one of said segments having a predetermined axial index of refraction profile;

in each lens adjacent ones of said segments being joined at interfaces, each of said interfaces forming finite, non-normal angles with said lens optical axis; and said second lens being oriented with its optical axis collinear with said first lens optical axis and rotated 90 degrees about its optical axis from said first lens.

* * * * *